(12) United States Patent
Church et al.

(10) Patent No.: US 7,430,633 B2
(45) Date of Patent: Sep. 30, 2008

(54) PRE-STORAGE OF DATA TO PRE-CACHED SYSTEM MEMORY

(75) Inventors: Kenneth W. Church, Seattle, WA (US); Robert J. Ragno, Kirkland, WA (US); Bo Thiesson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 11/298,218

(22) Filed: Dec. 9, 2005

(65) Prior Publication Data

US 2007/0136533 A1 Jun. 14, 2007

(51) Int. Cl.
*G06F 12/00* (2006.01)
*G06F 13/00* (2006.01)
*G06F 13/28* (2006.01)
*G06Q 30/00* (2006.01)
*G07G 1/14* (2006.01)

(52) U.S. Cl. .................. 711/112; 711/111; 711/154; 705/14; 705/26

(58) Field of Classification Search .................. None
See application file for complete search history.

(56) References Cited

U.S. PATENT DOCUMENTS 5,717,893 A * 2/1998 Mattson ............... 711/129

| | | | |
|---|---|---|---|
| 2002/0010757 A1* | 1/2002 | Granik et al. | 709/218 |
| 2002/0073358 A1* | 6/2002 | Atkinson | 714/21 |
| 2002/0188853 A1* | 12/2002 | Owhadi | 713/182 |
| 2004/0158589 A1* | 8/2004 | Liang et al. | 707/206 |
| 2005/0273514 A1* | 12/2005 | Milkey et al. | 709/232 |
| 2006/0092966 A1* | 5/2006 | Sitnik et al. | 370/463 |
| 2006/0129782 A1* | 6/2006 | Bansal et al. | 711/170 |

OTHER PUBLICATIONS

Alan Simpson, Windows XP Bible, 2001, Hungry Minds, pp. 6, 23; 47, 198.*

* cited by examiner

*Primary Examiner*—Kevin Ellis
*Assistant Examiner*—Chad L Davidson
(74) *Attorney, Agent, or Firm*—Amin, Turocy & Calvin, LLP

(57) ABSTRACT

System(s) and method(s) that facilitate utilizing pre-cached disk space. Pre-cached memory space within a storage device is identified, and a subset of the pre-cached memory space is pre-populated with data so that the data can be selectively and dynamically accessed. During use of a computer (e.g., in a web-browsing session) a subset of the pre-stored data can be dynamically and selectively exposed to the user as a function of user and/or computer application state. Pre-storage of the data on pre-cached memory of the computer mitigates delayed data access (e.g., due to insufficient transmission bandwidth) thereby enhancing user computing experience. The user can utilize the device without having to distinguish between pre-cached and free memory. In other words, the operating system can present the cached memory to the user so that it appears as free memory without the user having to direct the system to do so.

22 Claims, 12 Drawing Sheets

PRE-STORAGE OF DATA TO PRE-CACHED SYSTEM MEMORY

BACKGROUND

Disk storage capability is progressing at a more rapid rate than the ability of end users to download data stored on disks. Gordon Moore, one of the co-founders of Intel Corporation, made an observation in 1965 (now known as Moore's law) where the number of transistors per square inch on integrated circuits (ICs) had doubled every year since ICs were invented. This prediction has slowed to some extent, but data density has still doubled just about every 18 months—the majority of experts in this field expect Moore's Law to stay true well into the next decade.

Unfortunately, disk capacity is increasing at a much faster rate than is bandwidth transmission into homes, offices, schools, etc. Bandwidth is often defined as the amount of data that can be transferred over a network in a predetermined amount of time. It is normally expressed in kilobits per second (Kbps) or in millions of bits per second (Mbps). In 1993, a typical personal computer (PC) had a 100 megabyte (MB) hard drive and a 9.6 Kb/sec dialup modem, whereas presently a corresponding PC has a 100 Gigabyte (GB) hard drive and a 512 Kb/sec digital subscriber line (DSL) cable modem. Disk capacity is increasing at approximately 1000× per decade, while bandwidth into the home is only increasing at about 10×-100× per decade.

Compounding this issue is that telephone service is generally universal but broadband connectivity is not. According to some recent statistics there can be as many as ten times the number of telephone line connections as there are broadband connections—it may take decades for broadband to become ubiquitous.

Many digital storage devices are shipped today with unallocated or free disk and/or storage space, in other words memory cache that is not utilized. Mobile phones are sold with large storage cards; for example, a 1 GB card is now commonly available for extremely compact multimedia mobile phones used as digital cameras, videogame consoles, web interfaces, etc. Many of these storage cards are sold with little and/or no allocated disk space, which means that the unallocated space is large. Computer disks can be shipped with, for instance, twenty gigabytes of potentially useful data, loaded in the factory and yet, the disks are often shipped with a small fraction of the allocated disk space utilized.

USB flash drives (also called USB key chains, memory keys, etc.) are a widespread means of copying, moving and storing large quantities of data quickly and in a condensed manner. Almost all computers today have USB ports and operating systems that recognize flash drives and the majority of flash drives utilize built-in flash memory. Flash memory or flash random access memory can store permanent information on telephones, MP3 players, personal digital assistants (PDAs), cameras, etc. MPEG Audio Layer 3 players (MP3 players) make use of audio compression technology that compresses CD-quality sound by a factor of roughly 10, while retaining most of the original fidelity. Unlike RAM (random-access memory), flash memory can continue to store information in the absence of a power source. Palm devices often make use of flash memory to store the operating system and core applications. Unlike read only memory (ROM), the user can write to flash memory, making it possible to update the operating system and applications via software interfaces.

The devices are most often shipped from original equipment manufacturers (OEM), with data stored on only a small fraction of the available space, leaving a large amount of space on the equipment as unallocated or free space. For example, a computer might be shipped with an 80 GB hard drive with only 1 GB of software loaded on the computer, e.g., the operating system and other software, leaving 79 gigabytes of unallocated or free space. Downloading 79 GB of data (such as games, software, videos, music, etc.) over a 512 Kb/sec DSL/cable modem, would take approximately 1.78 days to download with no interruptions. In another example, a flash drive with over 2 GB of usable memory would take approximately 10 hours to download the data necessary to fill the device's unallocated or free space, utilizing a telephone line transmission rate of 58 Kb/s. It is to be appreciated that the storage capacities and transmission rates discussed above can vary based on the unallocated memory size and data transmission rates; however, these numbers are representative of devices and transmission rates that are currently available. Accordingly, there is a strong need in the art for a solution to address the ever increasing disparity between available memory space versus transmission bandwidth.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present selected concepts, in a simplified form, as a prelude to the more detailed description that is presented later.

The subject invention relates to systems and/or methods that facilitate utilizing unallocated disk space as pre-cached space. Content is pre-loaded to portions of memory that are conventionally not utilized prior to shipment to a user. Moreover, after a user takes control of a computer, content can likewise be pre-fetched and loaded to a subset of memory that is still not utilized. During use of the computer (e.g., in a web-browsing session) the pre-stored content in pre-cached memory can be dynamically and selectively exposed to the user. By having the content already stored in the pre-cache of the computer, conventional issues associated with delayed content delivery (e.g., due to insufficient transmission bandwidth) are mitigated. User computing experience is significantly enhanced as a result of the improved computing performance associated with pre-storing content on the client-side pre-cache memory.

According to an aspect of the invention there are three main types of memory: (1) allocated memory, the operating system and the software the user explicitly chose and/or chooses to have on the system—both initially and during the life time of the system; (2) pre-cached memory, which can be pre-loaded with software and/or data that is not selected by the user, but rather selected by the cache content providers, and; (3) unallocated (free) memory or available disk space. The user can utilize the device without having to distinguish between pre-cached and free memory. In other words, the operating system can present the cached memory to the user so that it appears as free memory without the user having to direct the system to do so, hence the cached memory can be turned into free or unallocated memory by the user without demanding additional action from the user. The user can explicitly decide to put something on the device either from the cache or from elsewhere outside the cache and the operating system can make this occur, transparent to the user.

The available disk space can be on USB flash drive memory key chains, camera memory sticks and cards, computer hard drives, digital video disks (DVDs), mobile phone memory storage cards, etc. These devices are often manufactured, packaged and shipped with large amounts of unallocated or free space. A plurality of data can be loaded on those device caches, in the previously unallocated or free memory space (pre-cached space) that can deliver added value to the customer. Data can be added by storage device manufacturers, software companies, advertisers, retail stores, end users, etc in accordance with the embodiments described herein.

According to one aspect of the invention, if a user with a "preinstalled payload of content" stored in pre-cache memory (referred to as cache) requests data from a manufacturer, the requested information could already have been pre-loaded on the user's disk (e.g., one of many digital files in the payload) allowing the user to order and obtain an electronic access key for the requested digital information, online. The user can then enjoy and/or utilize the requested digital information immediately without having to wait for the data to download. In another example, a user's web experience can be more enjoyable, productive, etc., if the pre-cached space were pre-loaded with web-pages the user may be interested in seeing and that the user can view while waiting for a slow website to load. The user can be looking at a requested cached version of a web-page while waiting for updates and functional features relating to the website to load, thus making more efficient use of user time. The user can be informed that he/she is looking at a cached page with an indicator, similar to current status indicators pointing out a waiting time. A system cache can be an area of formally unallocated memory to store input/output (I/O) maps temporarily and the files requested by looking at web-pages can automatically be stored on computer hard disk in a cache subdirectory. When the user returns to the web-page, a browser can obtain the page from the cache rather than the original server, saving time and network burden associated with additional data traffic. The user can typically vary the size of the cache, depending on the particular browser used.

Still another aspect can employ an artificial intelligence component that employs a probabilistic and/or statistical-based analysis to prognose or infer an action that a user desires to be automatically performed. For example, the artificial intelligence component can review the data the user is working with and can suggest software, stored in the cache, in real-time to assist the user in expediting work or can present advertisements, at critical times, that have a high probability of interest for the user.

In another example, a video company, whose business model is to ship movie DVDs to customers by mail, can make use of this innovation by having movies pre-loaded on a computer hard drive cache, prior to shipment. The customer can then order the movie through the company and be sent an electronic key over the network to unlock the movie (e.g., for a period of time). The video company can save the cost of packaging, shipping, handling, stocking, damage to DVDs, etc., and the customer can watch the movie "immediately" without delays due to the post office, going to a store, locating the DVD, downloading the movie, etc.

According to another aspect of the invention, users can bring "old" caches, files stored on a disk, into a participating store and exchange those caches for an upgrade, as often as the user pleases. Participating stores can include drug stores, department stores, grocery stores, newspaper stands, kiosks, convenience stores, etc., with participating companies such as those that sell books, software, movies, songs, games, advertisements, etc.

Client side advertisements can also be employed in accordance with the subject invention. Pre-loading advertisements can take place at numerous locations, including but not limited to, the factory, the point of sale, the shipping location, the packaging site, while in possession of an end-user (e.g., running in the background and/or during periods of non-use).

Targeted advertisements provide a method to show the user advertisements that the user would likely want to see. This innovation can be utilized with artificial intelligence to determine user preferences and select/tailor advertisements accordingly. An aspect of this innovation is that advertisers can have advertisements pre-loaded in memory caches. The OEM can pre-load, for a group of users, the same block of advertisements (e.g., creating efficiency) on a plurality of machines for a geographical area, the same type of machine, the machine price point is the same, etc. Through end user selection and/or usage the less reviewed ads and/or data can be discarded and frequently viewed ads, web-pages, etc., can replace them.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
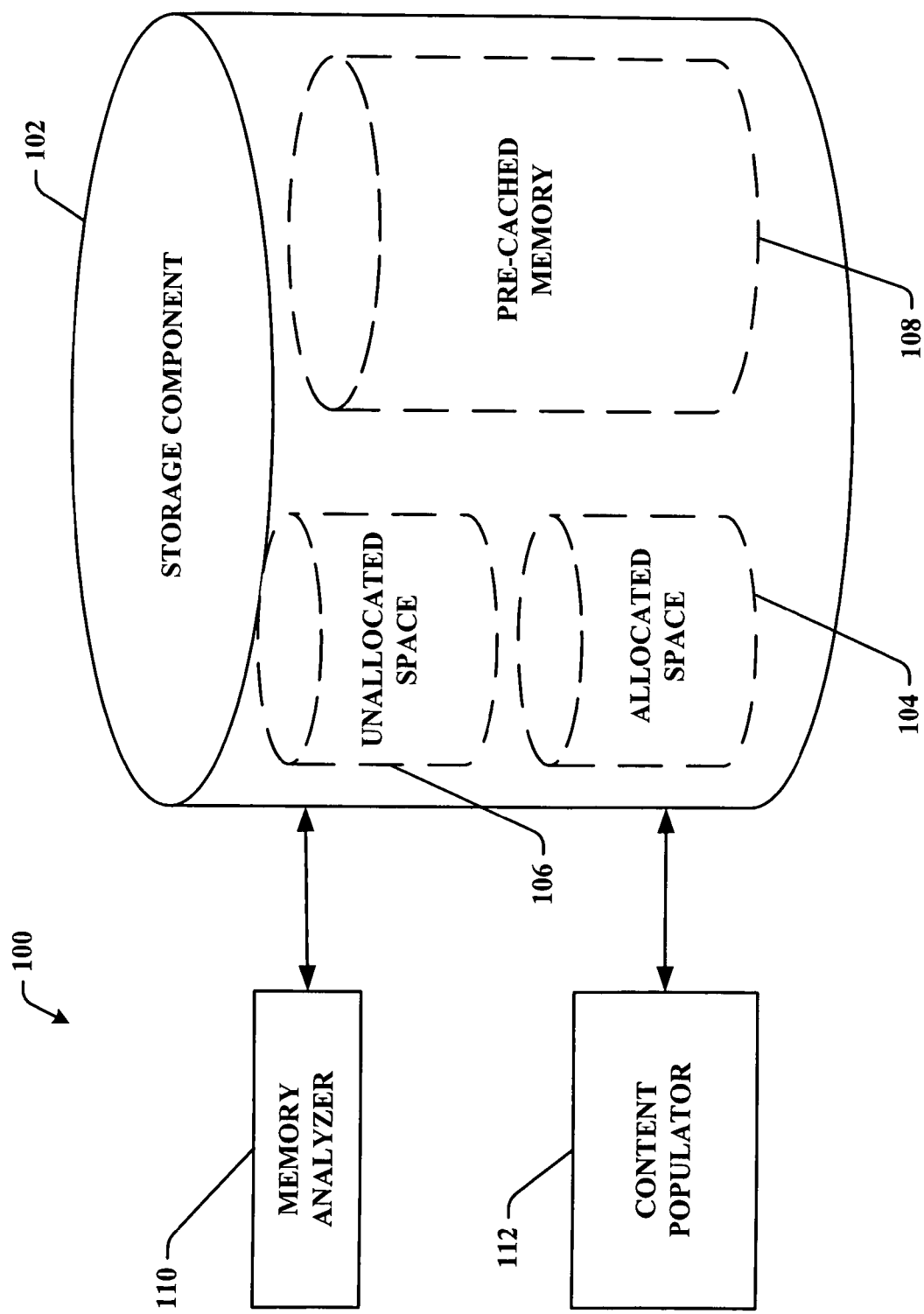
FIG. 1 illustrates a block diagram of an exemplary system that facilitates storing data in pre-cached memory.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. Memory analyzer(s), content populator(s), content selection component(s), optimization component, display component(s), filtering component(s), browsing component(s), artificial intelligence components(s) are all to be considered components in accordance with the foregoing.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As noted supra, there is ever increasing disparity between available memory capacity and available data transmission bandwidth. Embodiments described and claimed herein provide for enhancing user computer interaction by addressing this discrepancy in connection with data delivery. More particularly, data (that might be utilized in the future) is saved to available memory space (pre-cached space) at a client computer so that if desired the data is readily available as compared to if such data was downloaded in real-time. The user can utilize the device without having to distinguish between pre-cached and free memory. In other words, the operating system can present the cached memory to the user so that it appears as free memory without the user having to direct the system to do so.

FIGS. 1-5 describe various embodiments in connection with devices, systems and/or architectures. These figures include common components and for sake of brevity as the discussion through the respective figures progresses infra, redundant description of already described components is omitted for sake of brevity.

Now turning to the figures, FIG. 1 illustrates an exemplary embodiment (system 100) that can facilitate efficient handling of data by utilizing pre-cached space of a storage component 102. The storage component 102 is generally a conventional storage medium or mediums that serve to store software and/or other data. As is often typical for computing devices, portions of the storage component 102 (allocated space 104) are employed to store programs and data that the user(s) explicitly chose to have on the system, prior to shipment to a user and/or customer. The amount of allocated space 104 is more often that not a small percentage (typically <10%) of the total amount of memory available on the storage component 102. The available memory historically keeps increasing in capacity among new versions of storage components 102 with the advancement of memory design and production. The unallocated memory 106 is large (typically >90%), however the pre-cached memory 108 can be pre-loaded with programs, content, information, data [collectively referred to herein as data] selected not by the user, but rather by the pre-cache content providers thus substantially reducing the size of unallocated space 106. The system 100 makes use of this previously unused memory referred to herein, as pre-cached memory 108, that typically was primary populated by the user in connection with conventional systems. The pre-storing of the data can be performed prior to shipment as well as after a user receives the computing device (e.g., passively loading data in the background and/or during periods of low or no use).

A memory analyzer 110 identifies the amount of available pre-cached space 108 that can be pre-loaded with data by a content populator 112. The memory analyzer 110 can determine an approximate amount of space 108 that can be pre-populated with data—any suitable techniques for memory space identification can be employed in connection with the embodiments described herein. The memory analyzer 110 can also perform a utility-based analysis that factors costs of using too much space 108 for pre-populated data versus benefit of pre-populating. The system 100 can present populated pre-cached memory 108 (cache) so that it appears to the user as free (unallocated) memory 106, in other words, the user does not have to distinguish between unallocated memory 106 and pre-cached memory 108, the system does that for the user in the background. For example, it is appreciated that the user will typically desire some portion of the unallocated space 106 to be available for storage of data the user desires to save on his/own accord. The memory analyzer 110 can factor this need in connection with how much of the pre-cached space 108 to utilize for pre-population of data. The user can explicitly decide to put something on the device either from the cache or from elsewhere outside the cache without having to determine what memory to use. It is to be appreciated that the pre-cached space 108 is not simply limited to a single storage medium but can optionally comprise multiple mediums (including hard drives, storage cards, memory sticks, secondary computing devices operatively coupled to a primary device, etc.)

In one example, the software and/or data can be installed in the pre-cached space 108 of a computer by the content populator 112, at the factory, of the original equipment manufacturer (OEM), prior to shipment to the customer. The memory analyzer 110 can determine the overall capacity of the storage component 102 to be 100 GB, with 3 GB allocated for the operating system and various software packages within the allocated space 104, thus leaving 97 GB of available memory in the pre-cached space 108. It is to be appreciated that the system can operate without the need for "real free space" because the user "sees" pre-cached space 108 as available memory, however the operating system may need some free space 106 to work efficiently. The OEM, utilizing the content populator 112, can pre-load various software and/or data on the pre-cached space 108, such as frequently visited webpages, popular video games, trendy songs, the latest movies, best selling software, advertisements, etc. The user can then have access to a game, located in the cache, for a limited time and then if deciding to purchase, can buy an encryption key, to unlock the game. The user can benefit by having immediate access to the game, if it is part of the software pre-loaded into the pre-cached space 108, without having to download it.

In another example, the storage component 102 can be a mobile phone storage card with 512 MB of overall memory, and 50 MB of memory in allocated space 104, dedicated to phone operation, features, etc., and the remaining 462 MB of pre-cached memory 108, determined by the memory analyzer 110. Various songs and/or ring tones can be pre-loaded on the phone, by the content populator 112, prior to shipment to the end user. This media pre-loading, by the content populator 112, can take place at various locations, such as the OEM, the shipper, the distributor, the retail store, etc. Again the end user can have the benefit of not having to download music onto his phone but rather, can activate a music license and enjoy the music right away. Furthermore, the content populator 112 can pre-load data to the pre-cached space 108 after the user has possession of the phone. For example, data can be wirelessly transmitted to the phone and the content populator 112 stores a subset of this transmitted data to the pre-cached space 108 so that such data is readily available to the user in the phone cache when desired (mitigating the often lengthy time periods associated with wireless downloading of data in real-time).

The content populator 112 can receive data from any of a variety of sources, mediums and communications protocols such as, the Internet, a hard-wire network connection, wireless, infra-red, Blue-tooth, ultra-wide band, satellite. The data can be provided by, for example, advertisers, OEMs, merchants, entertainment providers, software suppliers, government, universities, etc. Given the vast amounts of data available for pre-storing to the space 108, selection and filtering systems can be employed (discussed in greater detail infra) to pre-populate the space 108 with a subset of available data that would be meaningful in large part to respective users.

It is conceivable that the amount of available space 108 could grow to a very large capacity (e.g., 10 terabytes)—the data of two million books (~99% of available books at many present day online book stores) or twenty thousand high definition TV (HDTV) movies (40% of the amount of videos available at many present day video rental businesses, but with better fidelity). Unless substantial gains are equally met by advances in bandwidth technology, pre-loading of data to pre-cached memory may increase in value toward optimizing user computing experiences.

It is to be appreciated that the subject embodiment as well as other embodiments described herein can optionally employ various artificial intelligence based schemes for automatically carrying out various automated functionality described herein. Accordingly, any suitable component or act discussed herein can optionally utilize AI in connection with facilitation of carrying out a subset of functionality associated therewith. For example, inferring suitable data and the amount thereof to be pre-stored can be facilitated via an automatic classifier system and/or process.

A classifier is a function for example that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed (e.g., pre-storing of data). In the case of pre-storing information to unallocated memory space, for example, attributes can be file types or other data-specific attributes derived from the file types and/or contents, and the classes can be categories or areas of interest.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the invention can employ classifiers that are explicitly trained (e.g., via a generic training data) as well as implicitly trained (e.g., via observing user behavior, receiving extrinsic information). For example, SVM's can be configured via a learning or training phase within a classifier constructor and feature selection module. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Other implementations of AI could include alternative aspects whereby based upon a learned or predicted user intention, the system can prompt for authorization to pre-store data. Likewise, an optional AI component can remove pre-cached 108 data to increase the amount of unallocated memory 106 space. The data to be removed from the cache can be determined by the AI component without user interaction, effectively mitigating the pre-cache as free memory to the user.

Figure 2:
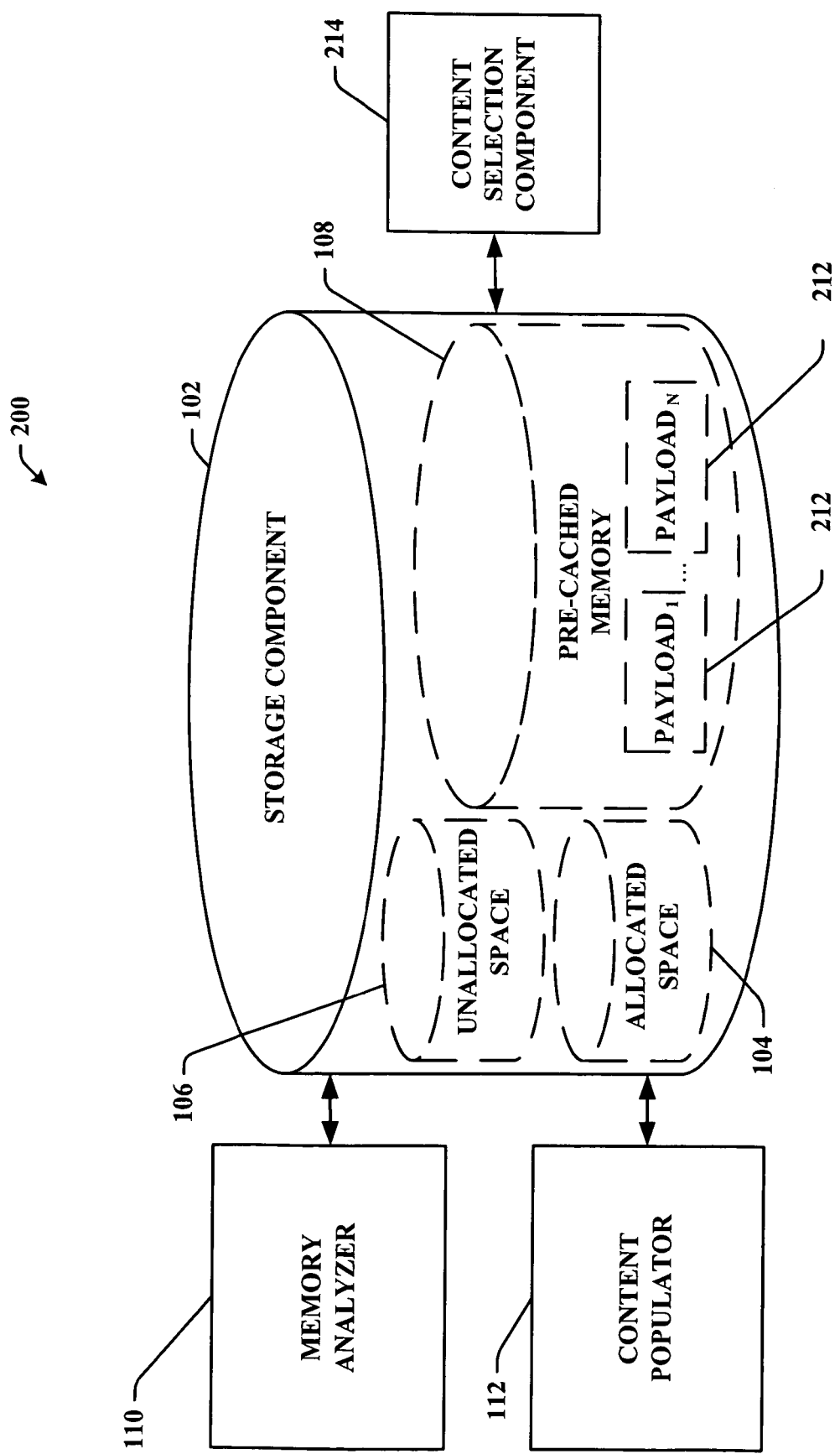
FIG. 2 illustrates a block diagram of an exemplary system that facilitates selecting content stored in a storage medium.

FIG. 2 illustrates an exemplary system 200 of one particular embodiment that can facilitate efficient storing of selected data in pre-cached memory of a storage component. The storage component 102 memory is typically made up of an allocated space 104 portion, an unallocated space 106 portion and an pre-cached space 108 (typically >90%) portion that, as discussed supra, has progressed at a much more rapid rate than bandwidth transmission. The system 200 can utilize the pre-cached space 108 by pre-storing a payload 212 to this space 108, such as for example programs, content, information, data, jointly referred to herein as payload 212. The user can receive a device with payload 212 pre-stored and/or the payload 212 can be passively pre-loaded during periods of low or no use or by pre-storing in the background. Payload 212 stored in the pre-cached space 108 can be illustrated as $payload_1$ to $payload_N$, where N is an integer.

Memory analyzer 110 can be utilized to determine the amount of memory available in the pre-cached space 108 to store payload 212, utilizing the content populator 112. It is to be appreciated that the payload 212 can optionally include various data (including video games, movies, music, ring tones, operating systems, photographs, software, audio files, etc.). A content selection component 214 can determine the payload 212 to store in the pre-cached space 108 based on factors such as for example, user demographics, device purchased, user's gender, user profile, user preferences, likelihood of user employment, optimization of monetary margins etc. The storage component 102, for example, can thus be shipped with the majority of the pre-cached space 108 filled with selected payload 212 prior to being received by the end user, which can enhance the user's computing experiences by at least reducing the number of long downloading events.

In one example, the payload 212, selected by the content selection component 214 and pre-stored in the pre-cached space 108 can contain web-page payload 212 that are frequently accessed (e.g., by computer users in that geographic area). The pre-loaded and/or pre-stored web-page payload 212 can range from most popular down to the least popular web-pages pre-loaded until the available pre-cached space 108 memory is filled to an optimized level (factoring in the expected need to maintain a certain amount of unallocated memory 106 to utilize by the user) as determined by the memory analyzer 110. In yet another example, the payload 212 can be satellite images that a user can load, along with user interfaces (UI) that can support hand-eye coordination, where delays in loading images are reduced to human reaction times (100 ms). It is also to be appreciated that the payloads 212 can be pre-loaded at the OEM, the shipping location, the packaging location, the retail store, etc. Having payload 212 stored in the pre-cached space 108 of various devices can reduce "traffic" on the Internet, to a substantial degree, thereby making the Internet more efficient. The need for computer centers to support transmission of payload 212 can be diminished, if these investments are obviated by this alternative technology for delivering content.

In yet another example, the memory analyzer 110 can be utilized to determine the memory allocation of the storage component 102 and the content populator 112 can pre-load music payload 212 in the pre-cached space 108. For example, the content selection component 214 can select the music to be pre-loaded in an MP3 player memory based upon such factors as user's gender, the geographic location, the device purchased, etc. and the content populator 112 can pre-load the music payload 212 that the end user would likely be interested in hearing. More specifically, music that might be listened to in the future can be available on the end user's MP3 player so that it is readily accessed versus downloading the music in real-time. The user can benefit by listening to music on the MP3 player prior to purchase and avoid waiting a long time to download music payload 212, for example, utilizing wireless transmission. Music producers can benefit by exposing end users to music payload 212, which end users may not otherwise be exposed to, in order to generate, e.g., monthly subscriptions. In another example, retail stores can install "free" music payloads 212 as a promotion for MP3 players and in addition music producers can work and/or partner with MP3 manufacturers to pre-load music payload 212 on players, which can thus offset device OEM's hardware costs, thereby increasing sales of MP3 players.

In another example, the storage component 102 can be a computer and the "digital rights" payload 212 in the pre-cached space 108 can contain a mixture of videos, music, software, photographs, satellite images, etc., chosen by the content selection component 214 based on; allocated space 104 purchased software, the users age, the computer accessories purchased, etc. The end user can be provided with movie trailers, featured songs, software trials, etc., payload 212 allowing a user to decide if the user wants to purchase, for example, a video, a song, software, etc. In order to purchase the selected payload 212, the user can provide a credit card number over the Internet to obtain an encryption key, which can "unlock" the payload 212. For example, a company that ships movie DVDs to customers through the mail can make use of this innovation by having movies pre-loaded on computer hard drives, prior to shipment. A customer can then order a movie at any time and when the allocated time to watch the movie is over, the video supplier's software (e.g., pre-loaded in the pre-cached space 108) can "lock" the movie again in the cache. The video company can save the cost of packaging, shipping, handling, stocking, damage to DVDs, etc. and a customer can watch a movie "immediately" without delays due to a post office, going to a store, locating a DVD, downloading a movie, etc. It is to be appreciated that the payload 212 data pre-stored in the pre-cached space 108 can be music, video games, photographs, audio files, satellite images, web-pages, movies, digital files, software, operating systems, etc.

Figure 3:
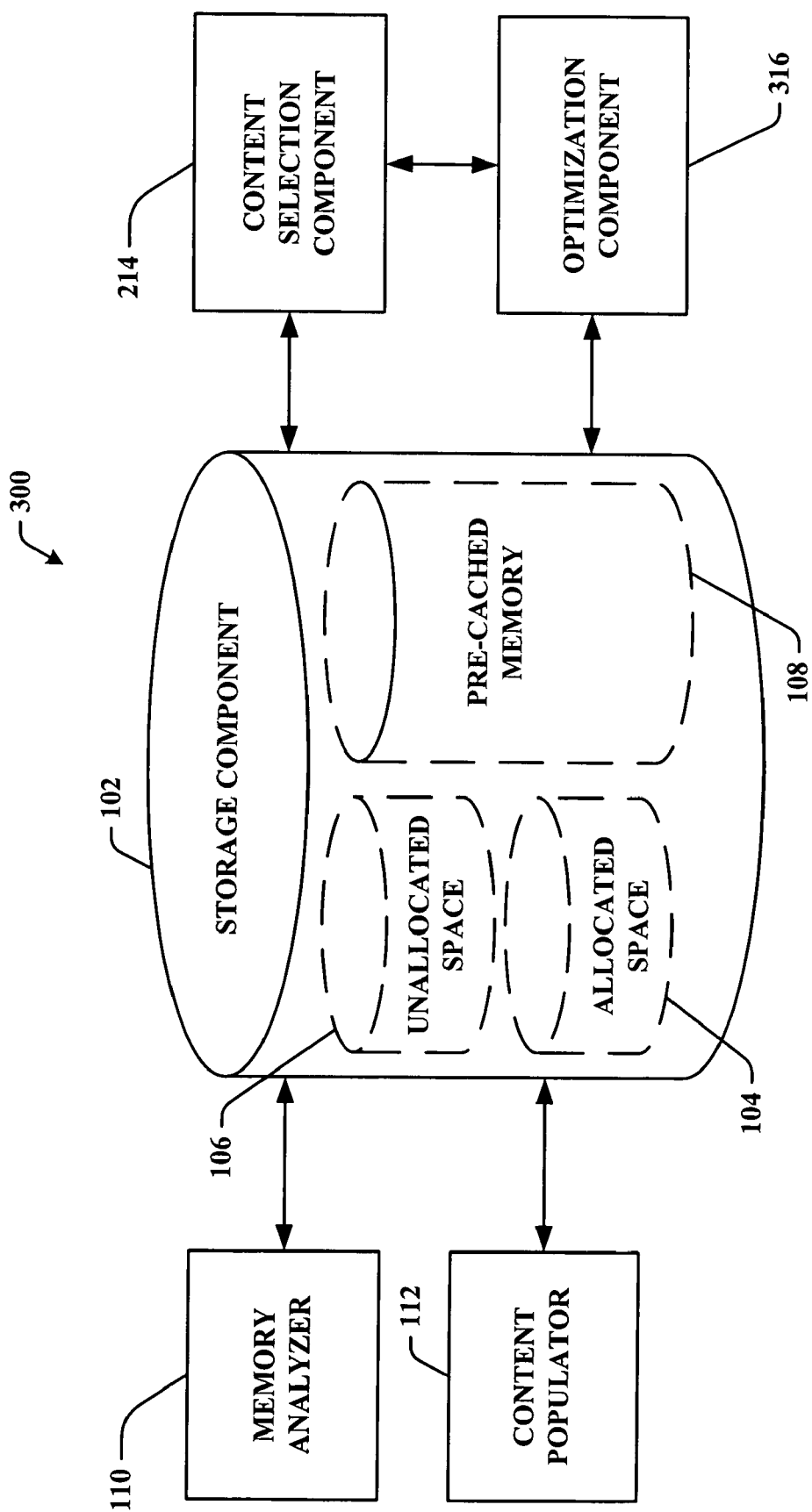
FIG. 3 is a block diagram that illustrates an exemplary system facilitating the storing of content in computer memory based on user preferences in accordance with the claimed subject matter.

FIG. 3 illustrates a system 300 that facilitates pre-storing data in pre-cached memory of the storage device based on user preferences with an aspect of the present invention. As mentioned supra, the amount of allocated space 104, as opposed to the pre-cached space 108, is more often that not a small percentage (typically <10% ) of the total amount of memory available within the storage component 102. The content populator 112 can be used in conjunction with the memory analyzer 110 to fill the pre-cached space 108 memory (typically >90%) to near capacity, if desired. The content selection component 214 can determine what software and/or data will be pre-stored in the pre-cached space 108 based on, for example demographics, such as where the storage component 102 was purchased, what the most popular software packages are in that area, the music listened to in that region, etc. An optimization component 316 can determine what data will be pre-stored in the pre-cached space 108 based on user's preferences, such as; favorite movies, favored sports teams, video games played, preferred music, etc.

In one example, the memory analyzer 110 can determine the amount of memory available for software and/or data in the pre-cached space 108. The optimization component 316 can obtain user preferences from a video game player order (e.g., data the user specified, such as; favorite games, gamers' hobbies, gamers' interests, etc.). The optimization component 316 together with the content selection component 214 can determine how the content populator 112 is to pre-load the pre-cached space 108. The optimization component 316 can base decisions on the user's provided preferences along with algorithms and predictive analysis. It is to be appreciated that optimization component 316 can base decisions and direct the pre-storage of data in the pre-cached space 108 based on multiple user provided preferences.

In another example, the storage component 102 can be the same video game player discussed supra and the games selected by the content selection component 214 can be for example, four games automatically selected by the optimization component 316 along with the highest selling games that have been released in the last two years. The optimization component 316, can work in conjunction with the content selection component 214 to direct the content populator 112 to pre-load the collection of video games. The optimization component 316 can direct the four user selected games to be pre-loaded first, then a selection of games that the user might be interested in playing based on user preferences, followed by any remaining content (e.g., based on ranking) that the content selection component 214 chose based on e.g., demographics. An end user can benefit by trying various games that the user may have shown a preference in, prior to purchasing the games. In order to purchase the game the user can call in over the phone, obtaining an electronic encryption key to unlock the game on the video game player. The game OEM can benefit by having games readily available to an end user, so that an end user can purchase games immediately. An end user can be made aware of more games than the user would normally be exposed to which can increase exposure for the game OEM. A game OEM can work with and/or partner with a game video player company to have games pre-stored in pre-cached space 108 memory on video game players and thus reduce the cost of the devices, thereby increasing sales and distribution. It is to be appreciated, that there are numerous other entities that could benefit from this technology (e.g., software developers, electronic component suppliers, video game creators, shippers, etc.).

In yet another example, having game payload 312 pre-stored in the pre-cached space 108 can reduce "traffic" on the Internet, thereby increasing Internet data throughput efficiency. Users can have access to games (with large memory requirements) without spending time to load such games (e.g., download or load from disk). The game supplier can support games pre-loaded in the pre-cached space 108 by releasing popular games that an end user can only obtain in that way. A video game producer can be afforded greater opportunities to showcase and benefit from smart caching of data in the pre-cached space 108. A smart and managed cache can improve customer experience in gaming and would offer interesting opportunities to enhance gamers' time spent online. Gamers can obtain additional content for the games they play, e.g., new weapons, cars, tracks/levels, as well as user interface themes and gamers pictures. The pre-cached space 108 of a video game player can contain an optimization component 316 which can determine what games the gamers is playing. Complementary data can then be drizzled or slowly downloaded into the pre-cached space 108 of the video game player, adding new game content to the cache to be available for use. The user can indicate through a user interface a desire to purchase and/or download new bits, offering immediate gratification of an "instant unlock" rather than potentially minutes or hours of downloading. Other approaches can be to drizzle demos or trailers of similar games into the cache based on the optimization component 316 analysis of the games that a user most often plays, so that the gamer can preview and experience a trial version for the next game coming out.

In yet another example, movies can be dynamically loaded to the pre-cached space 108 during periods of non-use (e.g., at night when the user is sleeping) so that the movies are readily available when desired for the user to access. Such feature would be very useful in connection with portable computing devices that have historically slow download capabilities (e.g., due to limited wireless bandwidth).

Figure 4:
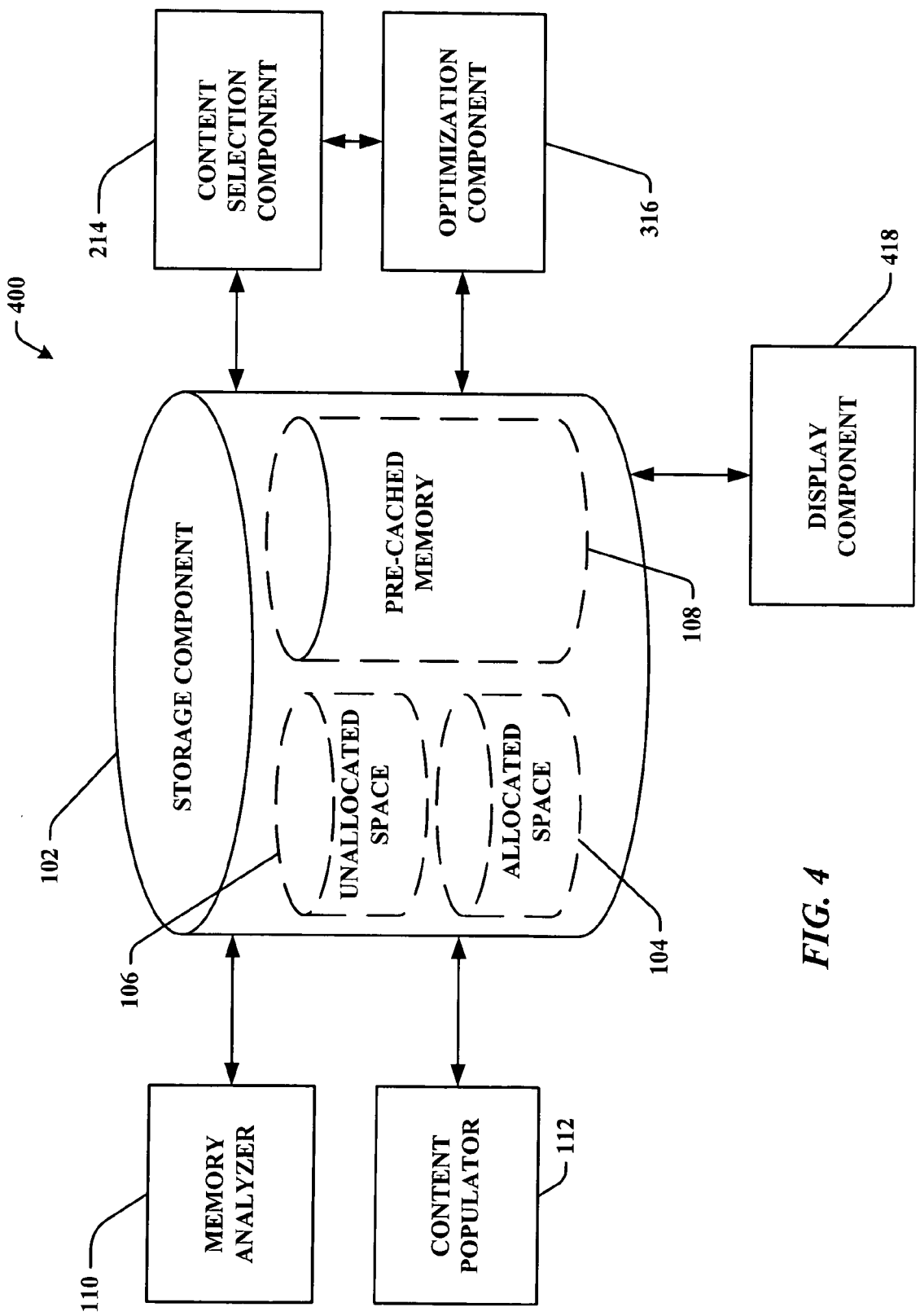
FIG. 4 illustrates a block diagram of an exemplary system that facilitates displaying data stored in pre-cached memory.

FIG. 4 illustrates a system 400 that facilitates displaying data in pre-cached memory of the storage device in accordance with an aspect of the present invention. A display component 418 can be utilized to assist the user in determining what data or content is pre-stored on the user's pre-cached space 108. In one example, the memory of the pre-cached space 108 can be filled to near capacity by the content populator 112 to pre-store advertisements in the device's free memory. The storage component 102 can thus be shipped with the majority of the pre-cached space 108 filled with advertisements selected by the content selection component 214 and the optimization component 316 prior to being received by the end user. The end user can be shown advertisements regarding various products that the user is likely to consider purchasing and if the user is interested in looking at a product, the product features can be described to the user in detail. A user can benefit by being educated on various products that the user may purchase if given enough information to make an informed and educated decision. The advertiser can benefit by reaching target audiences by focusing advertisements on the end users' devices and in that way can capture the user's attention. In another example, the advertisers can entice the user to download advertisements on the user's device by providing trendy and sought after advertisements that are only made available to users by pre-loading data to the device pre-cached space 108.

In one example, the device display component 418 can utilize the screen of a user's laptop and display to the user various headings that can be selected such as for example games, movies, software, music, etc. The user can be identified as e.g., a college student via the optimization component 316 based on data the user provided when purchasing the laptop computer. The user can be e.g., struggling with a math problem and can decide to look for math software that can be pre-loaded on the pre-cached space 108 based on algorithms and analysis of information provided by the user. The available software can be displayed using menu driven screens and the end user can select and purchase the software on-line. In this manner, a manufacturer can provide an almost immediate solution to a user that might not otherwise be familiar with the manufacturer's product. A standard bank of software can be pre-loaded on a computer's pre-cached space 108 for a particular school curriculum that can benefit both the end user, the software maker, Internet users (e.g., less traffic), etc. Prior to shipment, the storage component 102 can be pre-loaded with selected software and/or data prior to being received by the end user which can minimize the amount of time the user has to spend downloading data, at home, in the office, at school, etc.

Figure 5:
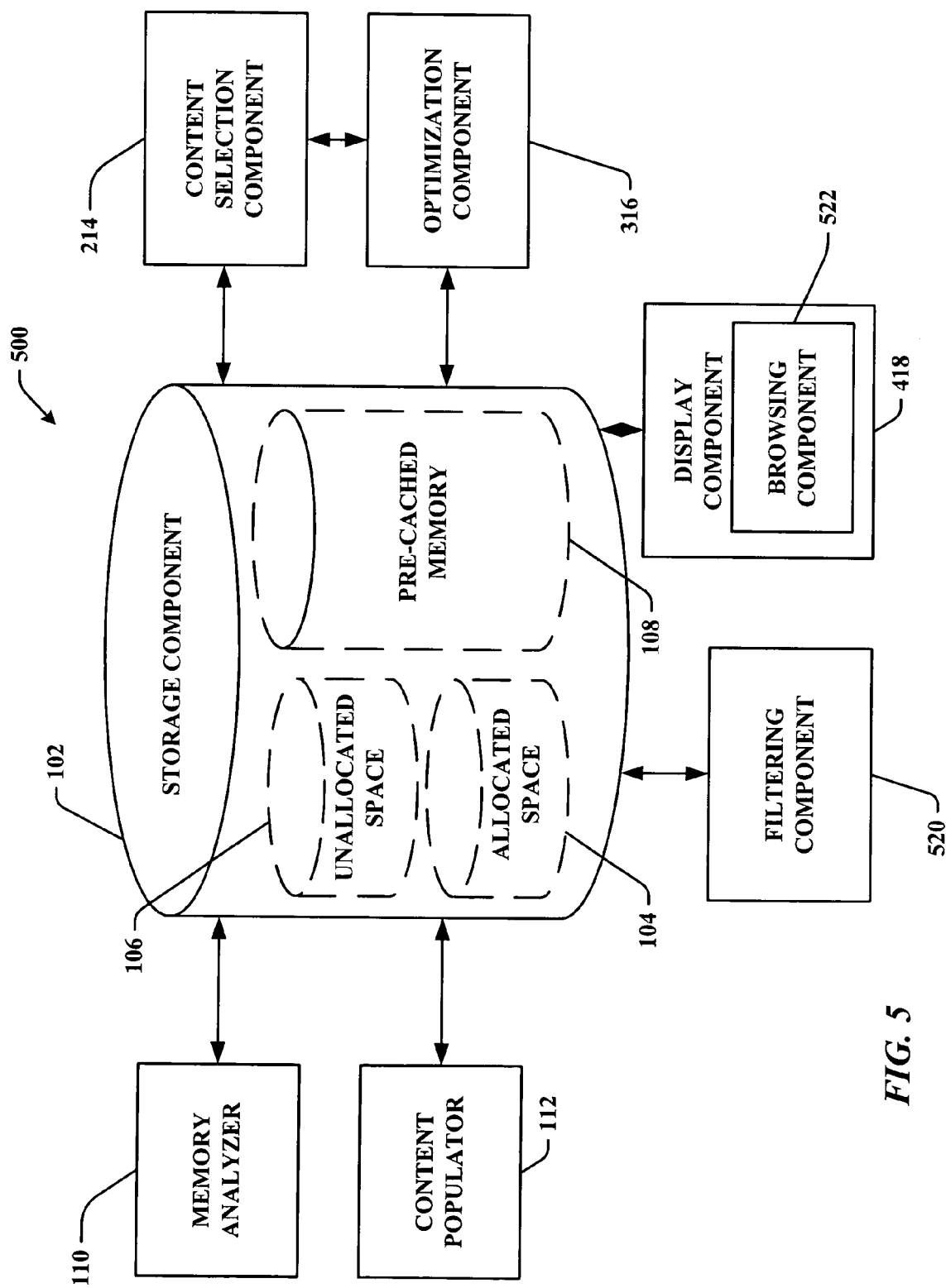
FIG. 5 illustrates a block diagram of an exemplary system that can be utilized to browse data stored in pre-cached memory.

FIG. 5 illustrates a system 500 that can facilitate the pre-storing and filtering of software in computer and/or digital device memory. The allocated space 104 and the pre-cached space 108 can often work in conjunction with each other and together the total shared memory make up a storage component 102 memory of a computer and/or digital device. The memory analyzer 110 can determine the amount of available memory in the pre-cached space 108 and work with the content populator 112 to pre-store data in the pre-cached space 108. The content selection component 214 and optimization component 316 can work in conjunction to optimize the data pre-stored in the pre-cached space 108 based on demographics and user preferences, respectively. A filtering component 520 can sort data already in the pre-cached space 108 and filter out data that is, for instance, used less frequently, within a certain time period without being "touched", which is identified by the filtering component 520 as not important, etc.

Frequently accessed web-pages can be pre-stored in the pre-cached space 108 (e.g., web-pages within a geographic area that are frequented by computer users), where the pre-loaded and/or pre-stored web-pages range from most popular to least popular until the available pre-cached space 108 memory is full or nearly full. The web-page can be those web-pages that the content selection component 214 selects based on demographics (e.g., local news, local weather, local advertisements, etc.) and the optimization component 316 identify based on user preferences (e.g., favorite sports teams, preferred music, etc.). The web-pages pre-stored in the pre-cached space 108 can be further organized by the filtering component 520 to increase the storage capacity of the cache.

In one particular example, web-pages pre-stored in the pre-cached space 108 can be removed by the filtering component 520, automatically if they have not been accessed by the user for 30 days or more (e.g., the time can be specified by the user). The user can also identify the web-pages that the user does not want displayed again by directing the filtering component 520 to both remove them and block future display of them. Web-pages that are over a predetermined size can be removed by the filtering component 520 if the user's available memory is below a specified limit. It is to be appreciated that the filtering component 520 can organize software and/or data based, for example, on data age, frequency of access, relationship to other data, priority of data, user preference, user state, file size, amount of available space, etc.

In another example, with a large collection of local content available to the end user in the pre-cached space 108, advertisements can be less generic and offer the end user a more personalized and secure experience. Because advertisements are already pre-loaded, advertisements can be targeted toward the end user with efficient algorithms while not revealing any personal information across the Internet. Information does not need to leave the device in order to fetch the appropriate advertisement. Also, a large local content pool on the end user's device can enable immersive and adaptive advertising that may not be readily available, if downloading the advertisements. Advertising can be inserted into games or displayed in the screen background (e.g., while playing music). Many advertisement approaches that can be impractical due to size constraints, such as games or interactive product walk-throughs, can be feasible with a large, local content store on the pre-cached space 108, to draw from. Client-side advertisements can have many other advantages, such as personalization with privacy, opportunities for more graphics and more creativity based on increased bandwidth, etc. These advertisement approaches would rarely be used if the user had to download the data because of the long time intervals involved.

In yet another example, companies can take advantage of optimized, filtered and pre-loaded data in the pre-cached space 108 in the area of digital rights management. The user can experience instant gratification after purchasing electronic keys (rights to use); without the normal delays that can be associated with stores, post offices and downloading data. OEMs can rent out memory in the pre-cached space 108 cache like retailers rent out shelf space in a store. Owners of movies, games, music, books, software, etc., can have their digital data pre-loaded onto users' disks, memory cards, memory sticks, etc., (e.g., even before the product is released). This distribution channel can have several advantages over traditional distribution channels, such as buying DVDs in stores, sending DVDs in the mail, downloading files over DSL lines, etc., and electronic keys are easier to keep track of than DVDs or other storage medium. Electronic keys can be sold separately, or by subscription. In addition, instant gratification can open up the markets to impulse buying, which can increase sales considerably, especially in categories (e.g., such as the children's movies).

Updating caches or pre-cached space 108 frequently makes the caches more valuable to all parties, e.g., users, advertisers and content providers. In one example, cache updating disks can be sold under a subscription plan that would encourage frequent updates and can be distributed on large external (e.g., flash) disk drives or pre-cached space 108. Users can bring their cache or pre-cached space 108 into participating stores and exchange it for an upgrade, as often as necessary. If for example, drug stores, grocery stores, convenience stores, kiosks, gas stations and retail stores participated in such a program, caches can be updated frequently, perhaps weekly, marketed like the Sunday newspaper.

End users can pick up and/or purchase the pre-cached space 108 or cache, which can carry features like the paper, among other things and can take a more central role in retailing and distribution. The value of a digital memory device can be in the data and not the actual amount of memory available. From the perspective of the OEM, retailer, advertiser, etc., a computer cache or pre-cached space 108 can be prime "real estate", like shelf space in a store, but with more bandwidth and less latency. In another example, computer OEMs and the retail stores that carry the OEM's product can utilize the pre-cached space 108 or cache as an opportunity to realize post sales commission business. Currently, retailers and OEMs do not generate additional sales after a customer takes a computer home. With the cache model, the supplier can gain commissions on subscriptions, advertisement revenues and other sales based on cache. Cache providers can benefit by licensing the cache concept to other parties such as OEMs.

Initially a browsing component 522 can be configured to take advantage of pre-cached space 108 or cache. Currently, users can be waiting for a slow website to respond and those users do not see much of interest until the web-page arrives. With the cache or pre-cached space 108 concept, the user can be looking at the cached version of the page while waiting. There can be several status mechanisms that can tell a user that the user is waiting for a slow website; these status mechanisms can be enhanced so users appreciate that the web-pages are cached pages while waiting for the network.

In another example, the relationship between the browsing component 522 and the web can look more like the relationship between software that provides an integrated solution for managing and organizing e-mails, schedules, etc. and software that provides a visual framework for exploring folders, creating properties, creating events, etc. Both the client and the server can maintain considerable memory in the pre-cached memory 108 and can synchronize together. It is to be appreciated that the synchronization can take place at various intervals specified by the user and/or provider. The combination of the client and the server are better together, though either can be used independently, the client can be used in off-line mode (without server) and the server can be used from any kiosk (e.g., without the client). The user can access the current applications with few alterations, but as more sophisticated advertisements and/or data become feasible to use due to large storage capacity in pre-cached space 108, e.g., panning and zooming large satellite images, etc., devices can take advantage of applications requiring large amounts of memory.

Data can be transferred from a pre-cached space 108 to a browsing component 522 within system 500. The delivery resource can be a resource provider, such as the Internet, a cell tower, an external store, etc. For instance, the user can access all the digital information the user requires from the pre-cached space 108 without ever crossing over e.g., the user's firewall. The provider of the caches or pre-cached space 108 can guarantee that the data pre-loaded in memory of a disk, DVD, memory card, etc., is not corrupted and or "safe" so that the user can worry less about downloading files or data that could harm the user's device. The user can also go out to the delivery resource to obtain digital files, data, music, etc., on "trusted" sites, thereby limiting the possibility of obtaining corrupt files, viruses, etc. It is to be appreciated that the pre-cached space 108 described supra can contain and/or pre-store any combination of digital data, such web-pages, software programs, photographs, video games, documents, books, movies, operating systems, songs, query logs, satellite images, etc.

In order to provide additional context for implementing various aspects of the claimed subject matter, FIGS. 6-10 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

FIGS. 6-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

Figure 6:
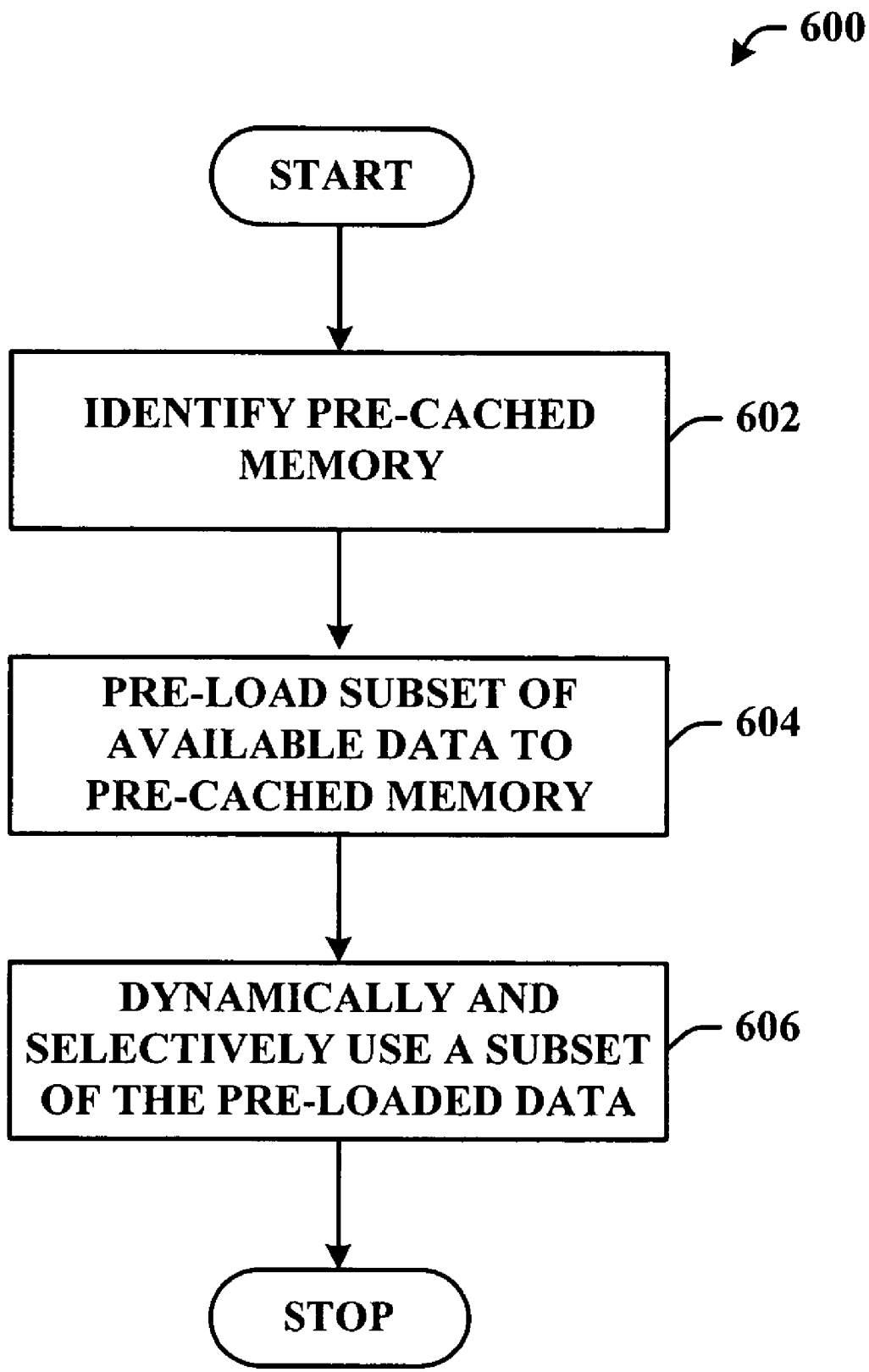
FIG. 6 illustrates an exemplary methodology for pre-loading a subset of data in the memory of the pre-cached space.

FIG. 6 illustrates a methodology 600 for utilizing pre-cached space within a storage component. At 602, the pre-cached memory size is determined. The storage component which includes the pre-cached memory, can be but is not limited to, various devices that can receive and pre-store electronic data, such as, disks, computer hard drives, memory cards, memory sticks, mobile phone cards, PDA memory, video game player memory and flash drives, depending on the particular application. The pre-cached space can be utilized to pre-store advertisements, software, music, video games, photographs, electronic books-on-tape, web-pages, digital files, etc. At 604, data (e.g., songs and/or movies) is pre-loaded to the pre-cached space of the storage component for future user. Such pre-storing of the data significantly reduces data access time as compared to conventional schemes which require user downloading and/or storing of data in real-time, which is largely dependent upon available data transmission bandwidth and processing capabilities (often at both source and destination). At 606, data (e.g., web-pages and/or software) in the pre-cached space of the storage component can be utilized by the end user. It is to be appreciated that all of the data is not used concurrently but typically and rather a small subset thereof. Accordingly, the appropriate subset of data is dynamically and selectively obtained for utilization by the user. Such data subset selection can be based on a variety of intrinsic as well as extrinsic factors (e.g., user state, application state, available resources, web-browsing state, cognitive load of user, inferred user preferences, inferred upcoming need(s), targeted advertising based on one or more of the aforementioned factors and/or other factors, etc. More particularly, the subset of data can be dynamically and selectively chosen so as to optimize and/or enhance a user's computing experience by providing rapid access to useful data.

Figure 7:
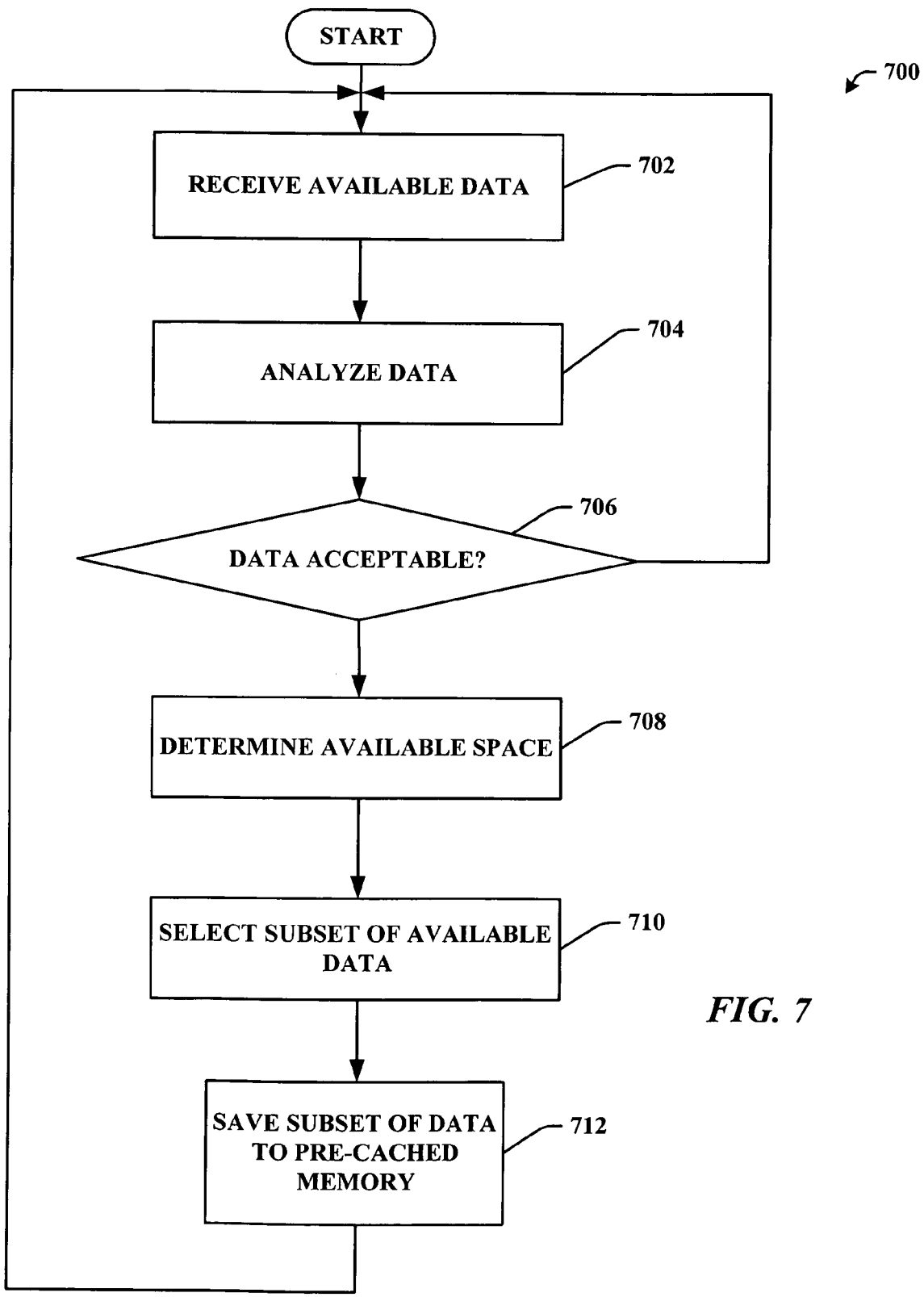
FIG. 7 illustrates an exemplary methodology for optimizing the data to be stored in the memory of the pre-cached space of the storage component.

FIG. 7 illustrates a methodology of analyzing and pre-storing a subset of data in accordance with an aspect of the invention. At 702, an available data set is received. The available data can be received from a variety of sources including, but not limited to, website owners, advertisers, video game developers or other data providers. The data can include web-pages, music, movies, software, etc., which is analyzed at 704 for acceptability. At 706, a determination is made if the data is acceptable for pre-storing in the pre-cached space. If the data is acceptable, the amount of available space to use is determined and a subset of the suitable data is stored to the pre-cached space at 708. Acceptability of the data can be a function of any of a number of metrics. For example, the data can be de analyzed based on content (e.g., if the user desire such content to be stored on his/her computer), the size of the data, relevance of the data to the user's expected needs, priority of the data, cost of the data, security risks, likelihood of future use, utility of the data, etc. At 710, a subset of the available and acceptable data is selected based on any one or more of the above-noted metrics or other metrics that would be readily apparent from the embodiments and examples descried herein. At 712, the subset of data is saved to the pre-cached space for potential future access thereto.

Figure 8:
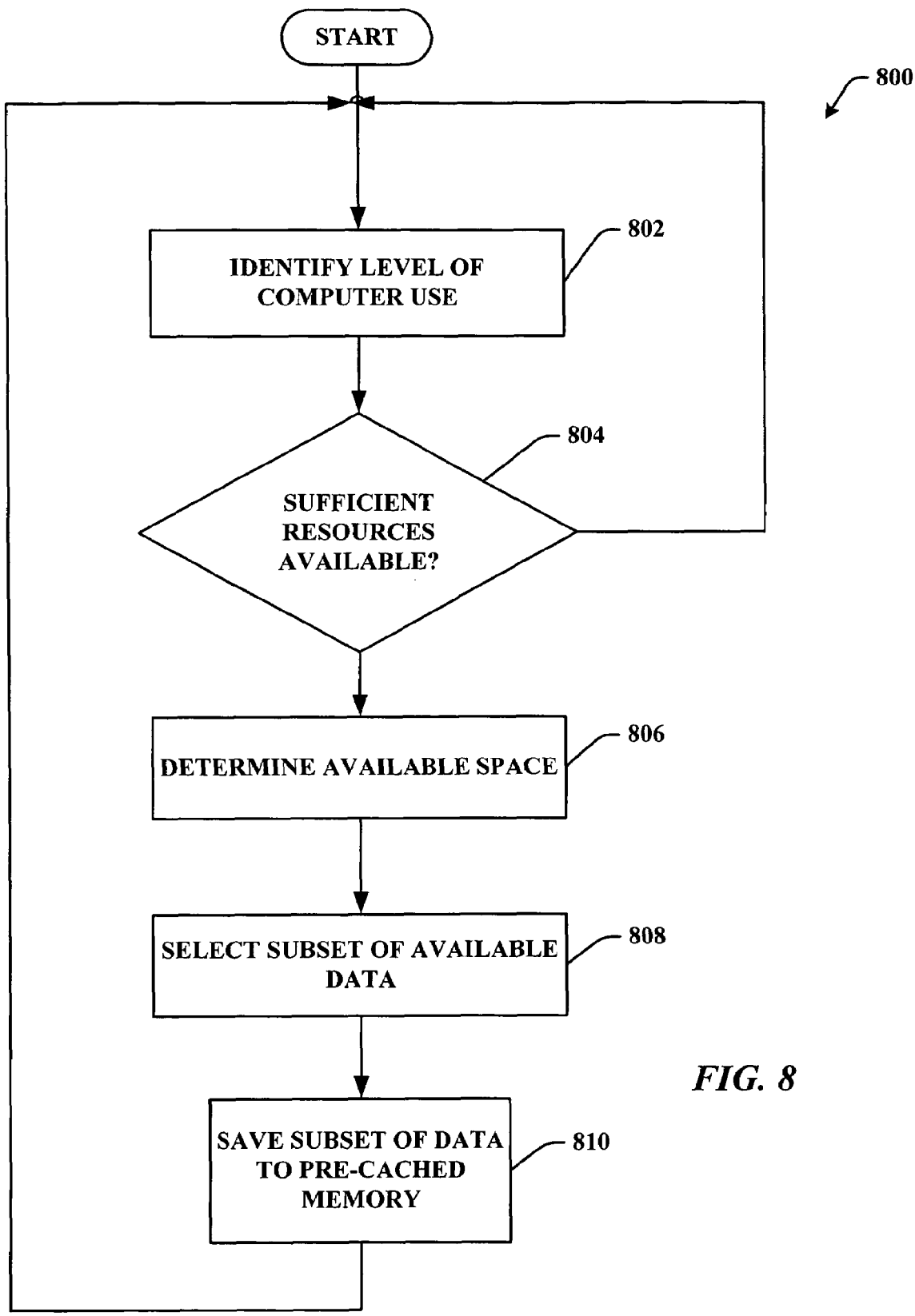
FIG. 8 illustrates an exemplary methodology for optimizing a subset of data to be stored in pre-cached space of storage component.

Referring now to FIG. 8, there is illustrated a methodology of determining an appropriate time slot for pre-storing of data. At 802, the level of computer use is identified, for example activities that are taking place and data resources currently and/or expected to be utilized are detected. At 804 a determination is made if there are sufficient resources available for saving data to a pre-cached space. For example, if a user is currently in a computing session and utilizing a high amount of computing resources, it would be inappropriate to start downloading data to the pre-cached memory space. On the other hand, if little or no computing resources are being used as well as not expected to be used in the near future it may be an appropriate time to start pre-storing of data. If sufficient resources are available then the amount of available space is determined at 806. At 808, a subset of available data is selected and is saved 810 to the pre-cached space memory.

It is to be appreciated that certain types of data (e.g., small size and easy to process) are more amenable for storing during a background storing session that is running concurrently with an active user computing session. Likewise, other data types (e.g., movies) of large size and complexity are more amenable for storing when high level(s) of computing resources and/or bandwidth are available.

Figure 9:
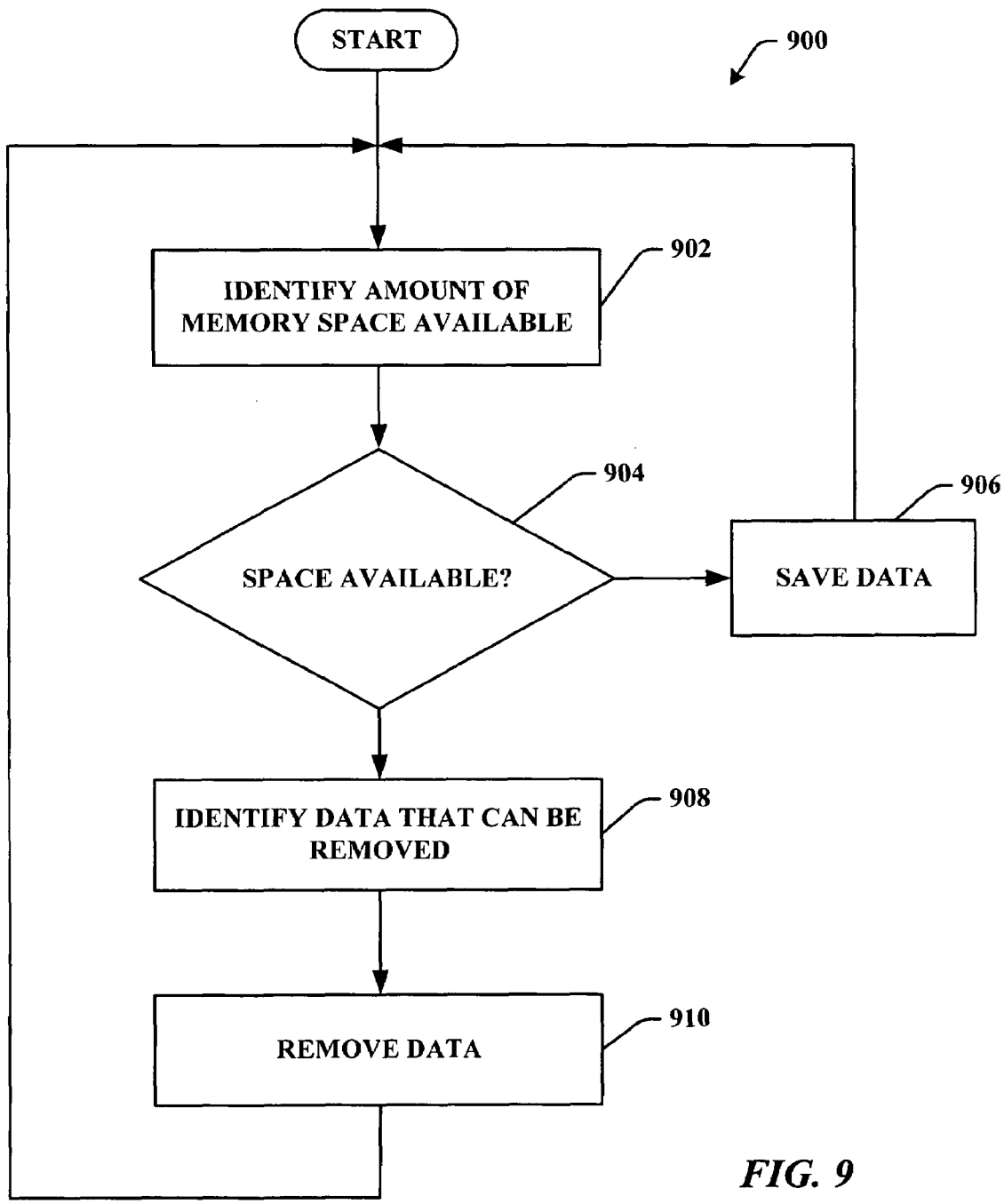
FIG. 9 illustrates an exemplary methodology for removing data from cache of the storage component based on memory space requirements.

Referring now to FIG. 9, there is illustrated a methodology of identifying data that can be removed from a memory space in accordance with an aspect of the invention. At 902, the amount of memory available in a pre-cached space is identified. At 904, a determination is made if there is enough memory space available in the pre-cached space. If it is determined there is adequate memory, the data can be stored in the pre-cached space at 906. At 908, if there is insufficient memory the filtering component based on input from the memory analyzer identifies a subset of data to be removed. At 910, the subset of data is removed.

The decision to remove certain data can be based for example on age of data, size of data, likelihood of future access, cost of storing data, priority of data, user preferences, a utility-based analysis (e.g., weighing keeping the data versus replacing with different data), relevancy of data, veracity of data (e.g., old, inaccurate news preferably should be updated with new, more accurate facts), etc.

Pre-cached memory is removed if more appropriate data becomes available for pre-caching, or if the user chooses to reclaim some of the pre-cached space. The user may reclaim pre-cached space either explicitly or implicitly by changing the size of the allocated or unallocated space.

Figure 10:
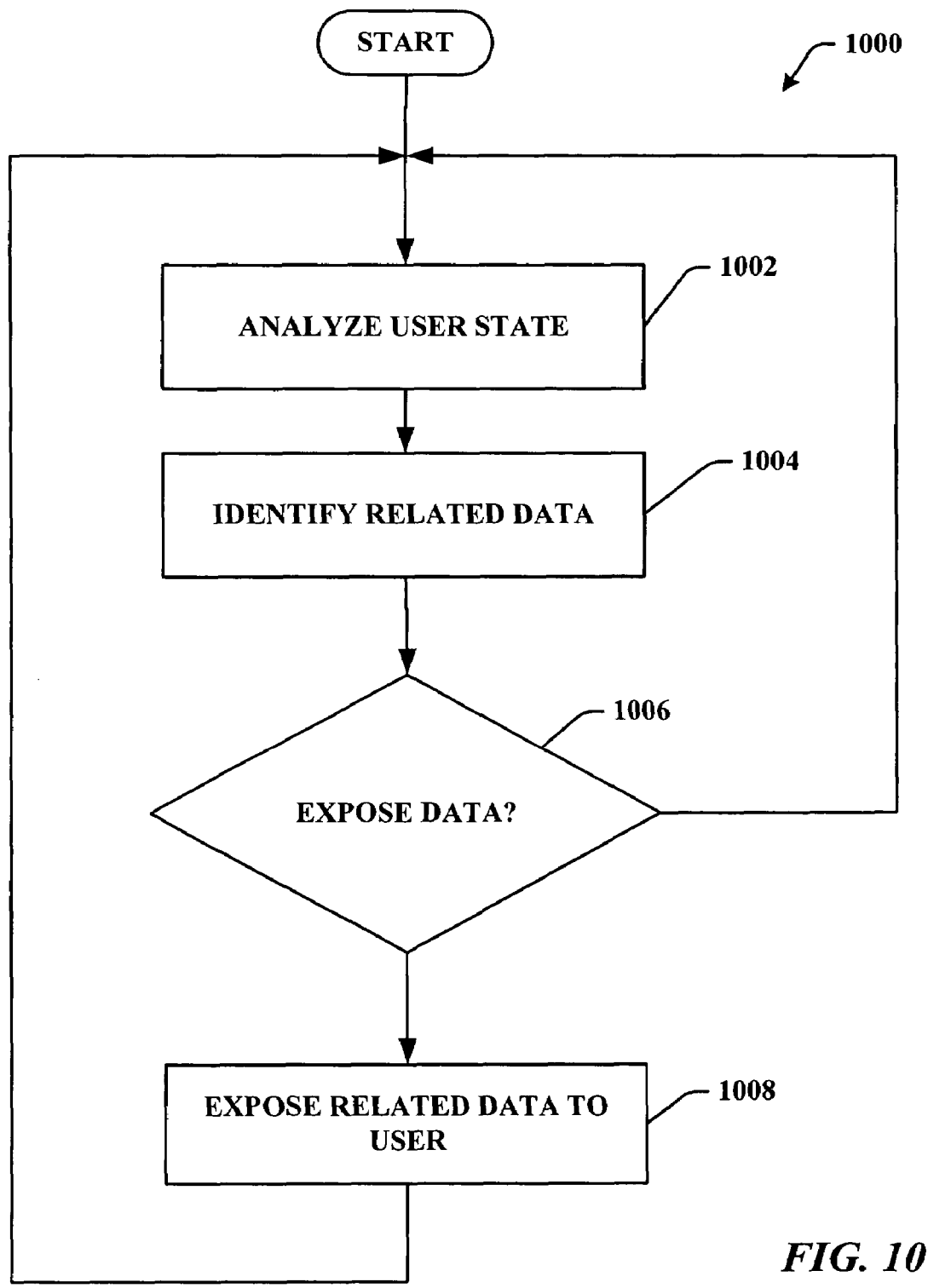
FIG. 10 illustrates an exemplary methodology for exposing data to user based on an analysis of user state.

FIG. 10 illustrates a methodology 1000 that facilitates identifying the user state so as to render relevant data to a user. At 1002, user state is determined/analyzed, for example; playing a game, watching a movie, working with software, waiting for a web-page to load, etc. At 1004, pre-stored data related to the user state is identified (e.g., based on demographics, profiles, inference, user preferences, user state, etc.). At 1006 a decision is made as to whether or not expose a subset of the identified data to the user based on his/her user state. At 1008, the subset of identified data is selectively exposed to the user.

The exposed data for example can be targeted advertisements. Employment of this methodology can facilitate point of purchase advertising by displaying to a user advertisement(s) that have a strong nexus to the user's current state. For example, if the user is reading a recipe, he/she may be more receptive to an advertisement for new cooking utensils than if he/she was in the middle of doing taxes.

The exposed data is not limited to advertising but rather can include subsets of most if not all the pre-stored data. The selective exposure of data can be employed to enhance a user's computing experience and/or increase revenues for $3^{rd}$ parties associated with the pre-caching of data on the pre-cached space of the user's computing system.

Those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

Figure 11:
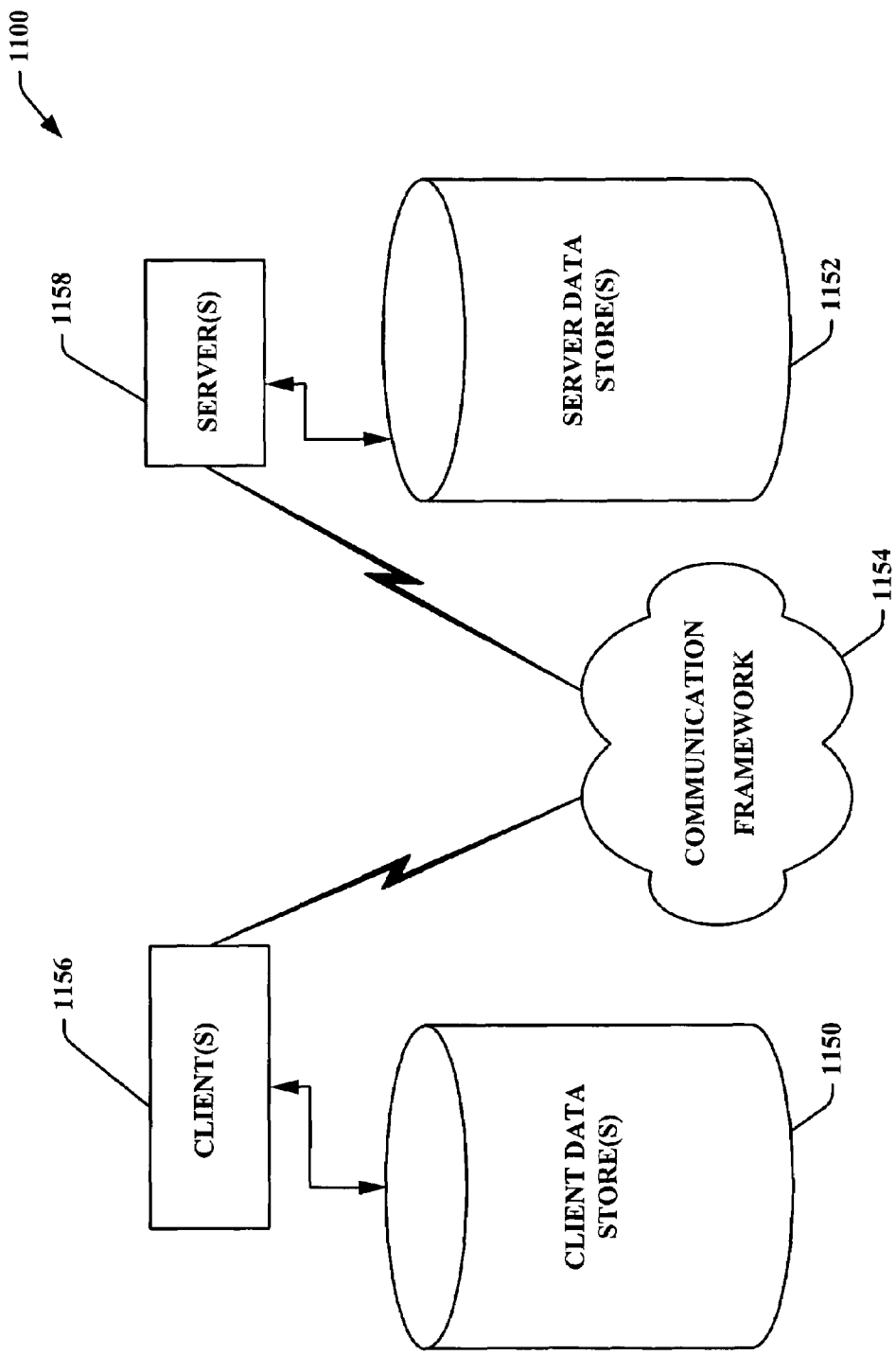
FIG. 11 illustrates an exemplary networking environment, wherein novel aspects of the claimed subject mater can be employed.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices) and can house threads to perform transformations by employing the subject innovation, for example.

One possible communication between a client 1110 and a server 1120 can be in the form of a data packet which can be adapted to transmit between two or more computer processes. The system 1100 includes a communication framework 1140 that can be employed to facilitate communications between the client 1110 and the server(s) 1120. The client(s) 1110 are operably connected to one or more client data store(s) 1150 that can be employed to store information local to the client(s) server 1110. Similarly, the server(s) 1120 are operably connected to one or more server data store(s) 1130 that can be employed to pre-store information local to the servers 1120.

Figure 12:
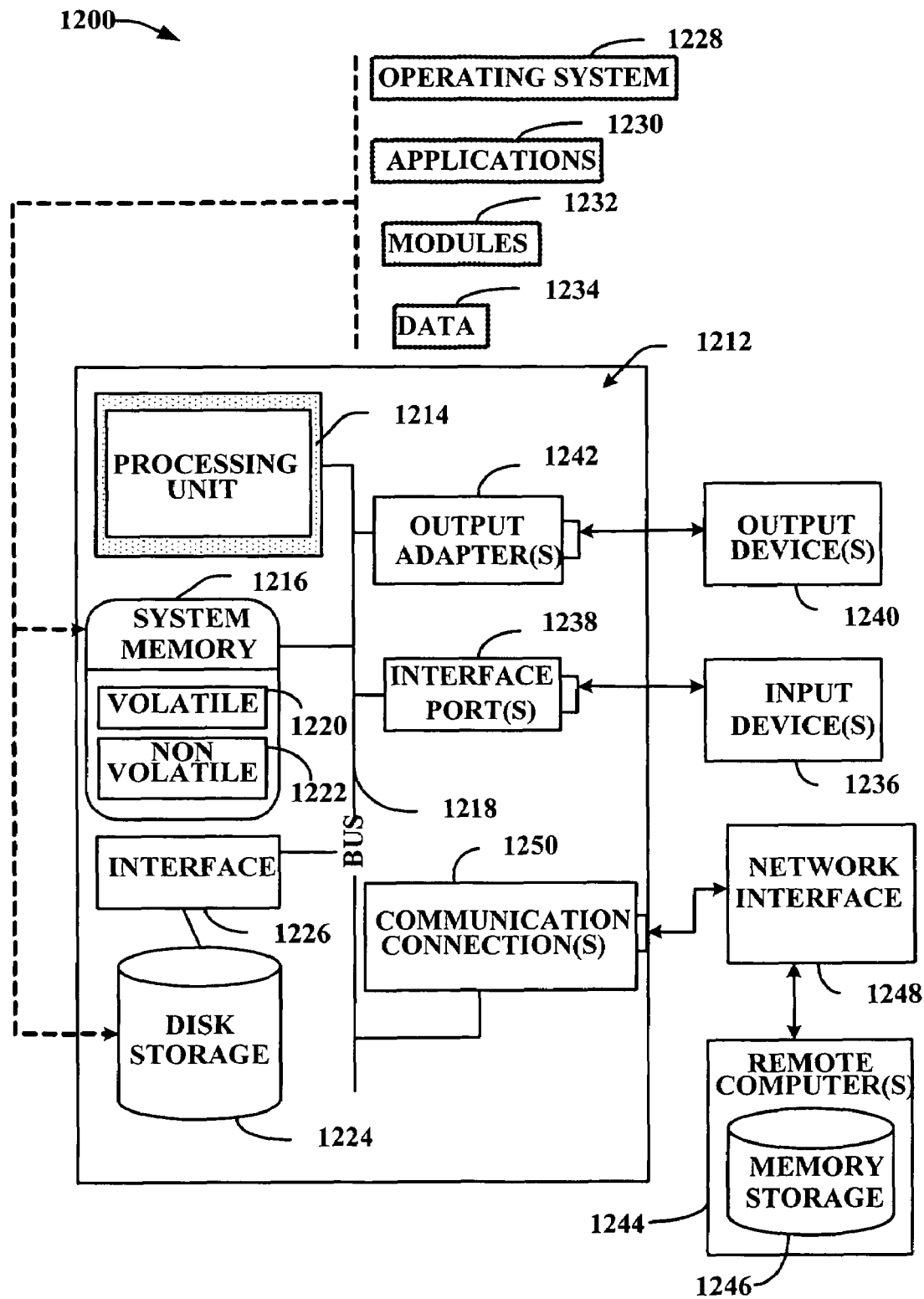
FIG. 12 illustrates an exemplary operating environment that can be employed in accordance with the claimed subject matter.

With reference to FIG. 12, an exemplary environment 1200 for implementing various aspects of the claimed subject matter includes a computer 12. The computer 1212 includes a processing unit 1214, a system memory 16, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1294), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like monitors, speakers, and printers, among other output devices 1240, which utilize special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates utilizing an unused portion of a digital storage media, comprising:
    a memory analyzer that identifies pre-cached memory space or unallocated memory space within a storage device, the pre-cached memory space is pre-loaded with data and is presented to a user as unallocated memory space; and
    a content population component that populates the pre-cached memory space with data that can be dynamically accessed during a computer application or web-browsing session.

2. The system of claim 1, the content population component writes the data to the pre-cached memory space at one or more of the following locations: the point of manufacture, the point of sale, the shipping site, the packaging site, the user site, the retail store.

3. The system of claim 1, the content population component stores in the pre-cached space at least one of the following: advertisements, images, programs, music, web-pages, movies, images, audio files, text files, operating systems, video, or games.

4. The system of claim 1, further comprising an optimization component that directs storing of data in the pre-cached space as a function of one or more users' preferences.

5. The system of claim 4, the optimization component employs artificial intelligence to infer the amount and type of data that should be pre-stored to the pre-cached memory space.

6. The system of claim 4, further comprising the optimization component that selectively removes a subset of the pre-stored data from the storage device to increase pre-cached memory space capacity.

7. The system of claim 4, further comprising the optimization component that selectively removes a subset of the pre-stored data from the storage device to allow allocated space to increase as the user explicitly stores data.

8. The system of claim 4, further comprising an organization component that selectively removes a subset of the pre-stored data from the storage device to allow the unallocated space to increase.

9. The system of claim 6, the organization component removes data as a function of at least one of the following: data age, frequency of access, relationship to other data, priority of data, user preference, user state, file size or amount of available space.

10. The system of claim 1, further comprising a filtering component that filters the data as a function of at least one of: user preferences, user state, user profile, file size, or available space.

11. A computer implemented method that facilitates pre-fetching of data to be stored on a storage medium, comprising:
    identifying available memory space within a storage medium;
    identifying data to be potentially saved to the storage medium, identification of the data is based at least upon a determination of the most popular software packages in the geographic area in which the storage medium was purchased at the time the storage medium was purchased;
    filtering the identified data based on identified interests of an end user; and saving a subset of the filtered data to a subset of the available memory space within the storage medium prior to delivering the storage medium to the end user for dynamic access during a web-browsing session; and presenting the subset of the available memory space to the user as unallocated memory space.

12. The method of claim 11 further comprising saving advertisements to the available memory space, and dynamically and selectively displaying a subset of the advertisements to a user as a function of user and/or computer application state.

13. The method of claim 11 further comprising permitting a user access to certain saved filtered data as a function of performing pre-determined acts.

14. The method of claim 13 wherein the pre-determined acts comprise being exposed to an advertisement.

15. The method of claim 11 further comprising saving the filtered data during periods of low or no computer activity.

16. The method of claim 11 further comprising filtering the data as a function of at least one of: user preferences, user state, user profile, file size or available space.

17. The method of claim 11 further comprising indexing the saved data, and mapping the indexed data to user and/or application states to facilitate quick access to data as a function of temporal relevance.

18. The method of claim 11 further comprising negotiating with a user to allow pre-saving of data to the storage medium.

19. The method of claim 11 further comprising performing a utility-based analysis in connection with filtering the data.

20. The method of claim 11 further comprising reserving an amount of the unused memory space for user future use.

21. The method of claim 11 further comprising automatically removing saved data as a function of at least one of: data age, frequency of access, relationship to other data, priority of data, user preference, user state, file size, or amount of available space.

22. A computer implemented system that facilitates prefetching data to be stored on a storage medium, comprising:

means for identifying available memory space within a storage medium;

means for inferring software content to which a user is willing to be exposed;

means for saving the software content to the available memory space prior to delivering the storage medium to the user;

means for selectively displaying a subset of the software content to the user, wherein the selection of the subset of software content is a function of at least one of the following: user state, application(s) currently being executed, or user preferences; and means for presenting the portion of memory on which the software content is saved as available memory space.

* * * * *

UNITED STATES PATENT AND TRADEMARK OFFICE
CERTIFICATE OF CORRECTION

| | | |
|---|---|---|
| PATENT NO. | : 7,430,633 B2 | Page 1 of 1 |
| APPLICATION NO. | : 11/298218 | |
| DATED | : September 30, 2008 | |
| INVENTOR(S) | : Kenneth W. Church et al. | |

It is certified that error appears in the above-identified patent and that said Letters Patent is hereby corrected as shown below:

In column 20, line 49, in Claim 9, delete "size" and insert -- size, --, therefor.

In column 21, line 21, in Claim 16, delete "size" and insert -- size, --, therefor.

Signed and Sealed this
Twenty-sixth Day of April, 2011

David J. Kappos
*Director of the United States Patent and Trademark Office*